US012226957B2

United States Patent
Vo et al.

(10) Patent No.: US 12,226,957 B2
(45) Date of Patent: Feb. 18, 2025

(54) SYSTEMS AND METHODS FOR PRODUCING A MIXER

(71) Applicant: Regeneron Pharmaceuticals, Inc., Tarrytown, NY (US)

(72) Inventors: Trinh Vo, Frederick, MD (US); Huyun Chen, Peachtree City, GA (US); Amardeep Singh Bhupender Bhalla, Montvale, NJ (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 242 days.

(21) Appl. No.: 17/395,176

(22) Filed: Aug. 5, 2021

(65) Prior Publication Data

US 2022/0040926 A1 Feb. 10, 2022

Related U.S. Application Data

(60) Provisional application No. 63/150,540, filed on Feb. 17, 2021, provisional application No. 63/085,080, (Continued)

(51) Int. Cl.
*B29C 64/386* (2017.01)
*B01F 27/90* (2022.01)
(Continued)

(52) U.S. Cl.
CPC ............ *B29C 64/386* (2017.08); *B01F 27/90* (2022.01); *B01F 35/512* (2022.01);
(Continued)

(58) Field of Classification Search
CPC ..................................................... B33Y 40/20
See application file for complete search history.

(56) References Cited

U.S. PATENT DOCUMENTS

2015/0165675 A1* 6/2015 Dawson ................ B29C 64/343
264/129
2016/0129635 A1* 5/2016 Cudak ................ G05B 19/4099
700/98
(Continued)

FOREIGN PATENT DOCUMENTS

FR 3022250 A1 * 12/2015 ............. B33Y 40/00

OTHER PUBLICATIONS

D. Chapple, S.M. Kresta, A. Wall, A. Afacan, The Effect of Impeller and Tank Geometry on Power No. for a Pitched Blade Turbine, Chemical Engineering Research and Design, vol. 80, Issue 4, 2002, pp. 364-372, ISSN 0263-8762, https://doi.org/10.1205/026387602317446407. (Year: 2002).*
(Continued)

*Primary Examiner* — Seyed Masoud Malekzadeh
*Assistant Examiner* — Vipul Malik
(74) *Attorney, Agent, or Firm* — Bookoff McAndrews, PLLC

(57) ABSTRACT

Systems and method for producing a small-scale mixer are provided. In some implementations, a method for includes obtaining dimensions of an at-scale mixer. The method also includes determining first dimensions of the small-scale mixer based on respective dimensions of the at-scale mixer. The method further includes determining second dimensions of the small-scale mixer independent of the dimensions of the at-scale mixer. Additionally, the method includes generating the small-scale mixer using the first dimensions and the second dimensions using a three-dimensional printer.

20 Claims, 23 Drawing Sheets

Related U.S. Application Data filed on Sep. 29, 2020, provisional application No. 63/062,129, filed on Aug. 6, 2020.

(51) Int. Cl.

| | |
|---|---|
| *B01F 35/512* | (2022.01) |
| *B01F 35/53* | (2022.01) |
| *B29C 64/00* | (2017.01) |
| *B29C 64/10* | (2017.01) |
| *B29C 64/30* | (2017.01) |
| *B29L 31/08* | (2006.01) |
| *B33Y 40/20* | (2020.01) |
| *B33Y 50/00* | (2015.01) |
| *B33Y 80/00* | (2015.01) |
| *B01F 101/22* | (2022.01) |

(52) U.S. Cl.
CPC .......... *B01F 35/5312* (2022.01); *B29C 64/00* (2017.08); *B29C 64/10* (2017.08); *B29C 64/30* (2017.08); *B33Y 40/20* (2020.01); *B33Y 50/00* (2014.12); *B33Y 80/00* (2014.12); *B01F 2101/22* (2022.01); *B29L 2031/08* (2013.01)

(56) References Cited

U.S. PATENT DOCUMENTS

| | | | |
|---|---|---|---|
| 2016/0175787 A1* | 6/2016 | Merrigan | B01F 23/41 366/144 |
| 2017/0029758 A1 | 2/2017 | Stadler | |
| 2017/0210063 A1* | 7/2017 | Andres | B29C 65/4825 |
| 2018/0010082 A1* | 1/2018 | Jaques | B01F 27/86 |
| 2018/0056252 A1* | 3/2018 | Steele | B01F 25/4332 |
| 2019/0184407 A1* | 6/2019 | Dimmelmeier | B03D 1/1456 |
| 2019/0345433 A1 | 11/2019 | Prabhudharwadkar et al. | |

OTHER PUBLICATIONS

W. Sammadikun, "Scale-up of mixing process based on constant power/volume and equal blend time using VisiMix simulation," 2018 International Conference on Information and Communications Technology (ICOIACT), Yogyakarta, Indonesia, 2018, pp. 424-428, doi: 10.1109/ICOIACT.2018.8350773. (Year: 2018).*

Anne Hansen, Evaluating Mixing in a Single-Use Bioprocessing System, Pharmaceutical Technology, Dec. 2, 2016, vol. 40, Issue 12, pp. 56-58, 63 (Year: 2016).*

Nienow, A.W., "Scale-Up, Stirred Tank Reactors," Encyclopedia of Industrial Biotechnology: Bioprocess, Bioseparation, and Cell Technology, John Wiley & Sons, Inc., pp. 1-14 (2010). (Year: 2010) (Year: 2010).*

Nienow, A.W., "Scale-Up, Stirred Tank Reactors," Encyclopedia of Industrial Biotechnology: Bioprocess, Bioseparation, and Cell Technology, John Wiley & Sons, Inc., pp. 1-14 (2010). (Year: 2010).*

Dhanasekharan, Kumar. "Design and scale-up of bioreactors using computer simulations." BioProcess international 4 (2006): 34-42. (Year: 2006).*

W. Sammadikun, "Scale-up of mixing process based on constant power/vol. and equal blend time using VisiMix simulation," 2018 International Conference on Information and Communications Technology (ICOIACT), Yogyakarta, Indonesia, 2018, pp. 424-428, doi: 10.1109/ICOIACT.2018.8350773. (Year: 2018).*

Anne Hansen, Evaluating Mixing in a Single-Use Bioprocessing System, Pharmaceutical Technology, Dec. 2, 2016, vol. 40, Issue 12, pp. 56-58, 63.

International Search Report for Application No. PCT/US2021/044768 dated Nov. 15, 2021.

Betterman et al., "Customizable 3D-printed stirrers for investigation, optimization and scale-up processes of batch emulsion copolymerizations", Chemical Engineering Science, vol. 206, 2019, pp. 50-62.

* cited by examiner

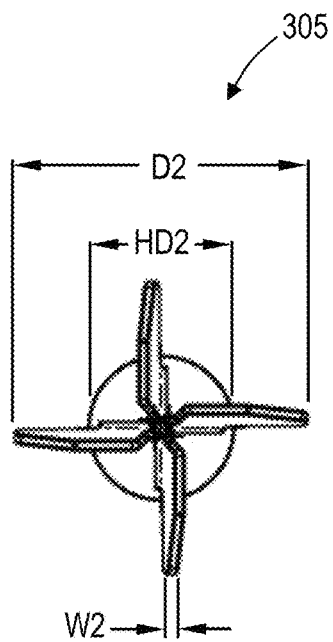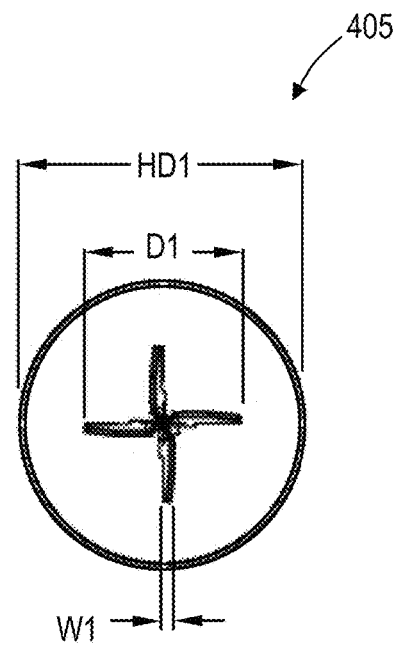
FIG. 3A  FIG. 4A
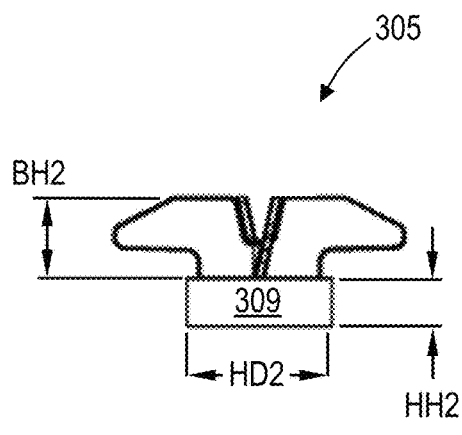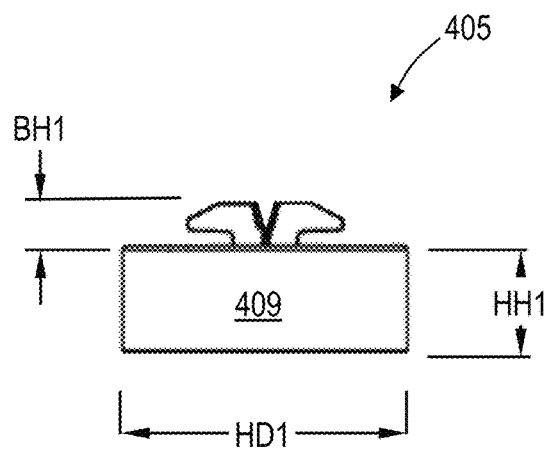
FIG. 3B  FIG. 4B

FIG. 7

| Impeller dimensions | | 305 | 405 | Scaling factor | 405 | Scaling factor |
|---|---|---|---|---|---|---|
| Diameter (mm) | (D) | 65.9 | 30.59 | 2.2 | 17.90 | 3.7 |
| Height (mm) | (BH) | 18.3 | 8.49 | | 4.95 | |
| Thickness (mm) | (W) | 2.4 | 1.10 | | 0.64 | |

FIG. 8

| Impeller dimensions | | 305 | 405 | Scaling factor | 405 | Scaling factor |
|---|---|---|---|---|---|---|
| Diameter (mm) | (D) | 100 | 21.54 | 4.6 | 17.10 | 5.8 |
| Height (mm) | (BH) | 28 | 6.03 | | 4.79 | |
| Thickness (mm) | (W) | 2.9 | 0.63 | | 0.50 | |

FIG. 9

| Impeller dimensions | | 305 | 405 | Scaling factor |
|---|---|---|---|---|
| Diameter (mm) | (D) | 175 | 22.05 | 7.9 |
| Height (mm) | (BH) | 37.5 | 4.72 | |
| Thickness (mm) | (W) | 3.9 | 0.49 | |

| Measurement | Tank #1 | | Tank #2 | | Tank #3 | | Tank #4 | |
|---|---|---|---|---|---|---|---|---|
| | Tank Diameter | Cylindrical Height | Tank Diameter | Cylindrical Height | Tank Diameter | Cylindrical Height | Tank Diameter | Cylindrical Height |
| 1 | 128.900 | 149.300 | 128.800 | 150.000 | 128.900 | 148.300 | 128.700 | 148.900 |
| 2 | 128.900 | 148.400 | 128.700 | 150.700 | 128.800 | 147.800 | 129.200 | 147.900 |
| 3 | 128.800 | 147.300 | 129.000 | 148.000 | 128.800 | 147.400 | 128.800 | 148.500 |
| 4 | 128.900 | 149.600 | 128.800 | 146.900 | 128.800 | 147.600 | 128.600 | 147.800 |
| Average | 128.875 | 148.650 | 128.825 | 148.900 | 128.825 | 147.775 | 128.825 | 148.275 |
| Std. | 0.050 | 1.034 | 0.126 | 1.757 | 0.050 | 0.386 | 0.263 | 0.519 |
| Expected | 129.048 | 149.500 | 129.048 | 149.500 | 129.048 | 149.500 | 129.048 | 149.500 |
| % Error | 0.13% | 0.57% | 0.17% | 0.40% | 0.17% | 1.17% | 0.17% | 0.83% |

FIG. 11

SMALL-SCALE IMPELLER RPM ACCURACY

| Setting speed (rpm) | Measured speed (rpm) |
|---|---|
| 150 | 149.3 |
| 250 | 247.9 |
| 350 | 350.3 |
| 450 | 448.4 |
| 550 | 550.3 |
| 650 | 648.4 |
| 800 | 801.2 |
| 1000 | 1001 |

FIG. 14

| Sample | pH | | Protein concentration (mg/ml) | | PS20 (w/v) | | Turbidity | |
|---|---|---|---|---|---|---|---|---|
| | 1802 | 1803 | 1802 | 1803 | 1802 | 1803 | 1802 | 1803 |
| Control | 6.2 | | 19.3 | | 0.05 | | 0.069 | |
| T0 | 6.3 | 6.3 | 19.3 | 19.4 | 0.049 | 0.049 | 0.064 | 0.064 |
| T30 | 6.3 | 6.3 | 19.5 | 19.4 | 0.050 | 0.049 | 0.068 | 0.066 |
| T60 | 6.3 | 6.3 | 19.3 | 19.4 | 0.049 | 0.049 | 0.066 | 0.068 |
| T90 | 6.3 | 6.3 | 19.4 | 19.3 | 0.049 | 0.049 | 0.069 | 0.067 |
| T150 | 6.3 | 6.3 | 19.4 | 19.4 | 0.049 | 0.049 | 0.070 | 0.068 |
| T240 | 6.3 | 6.3 | 19.3 | 19.4 | 0.049 | 0.049 | 0.068 | 0.065 |
| T300 | 6.3 | 6.3 | 19.4 | 19.3 | 0.049 | 0.048 | 0.069 | 0.069 |
| T480 | 6.3 | 6.3 | 19.3 | 19.4 | 0.050 | 0.049 | 0.072 | 0.067 |
| T1320 | 6.3 | 6.3 | 19.6 | 19.4 | 0.049 | 0.049 | 0.069 | 0.072 |

FIG. 19

| Sample | Purity 1802 | | | Purity 1803 | | | Particle #/ml (MFI) 1802 | | | Particle #/ml (MFI) 1803 | | |
|---|---|---|---|---|---|---|---|---|---|---|---|---|
| | % HMW | % Main | % LMW | % HMW | % Main | % LMW | ≥2 μm | ≥10 μm | ≥25 μm | ≥2 μm | ≥10 μm | ≥25 μm |
| Control | 1.86 | 97.42 | 0.71 | 1.90 | 97.40 | 0.71 | 313 | 15 | 0 | 29 | 2 | 2 |
| T0 | 1.89 | 97.41 | 0.69 | 1.98 | 97.28 | 0.73 | 837 | 42 | 8 | 242 | 19 | 0 |
| T30 | 1.99 | 97.30 | 0.71 | 1.99 | 97.29 | 0.72 | 600 | 68 | 42 | 638 | 67 | 0 |
| T60 | 1.88 | 97.41 | 0.71 | 1.89 | 97.48 | 0.63 | 688 | 56 | 15 | 640 | 63 | 2 |
| T90 | 1.98 | 97.29 | 0.73 | 1.96 | 97.35 | 0.70 | 724 | 58 | 8 | 684 | 75 | 0 |
| T150 | 1.96 | 97.31 | 0.73 | 1.96 | 97.32 | 0.72 | 1041 | 111 | 29 | 1495 | 81 | 2 |
| T240 | 1.96 | 97.36 | 0.69 | 1.85 | 97.43 | 0.72 | 794 | 79 | 17 | 1280 | 100 | 2 |
| T300 | 1.84 | 97.42 | 0.73 | 1.96 | 97.31 | 0.73 | 772 | 61 | 17 | 1774 | 146 | 0 |
| T480 | 1.93 | 97.34 | 0.74 | 1.83 | 97.47 | 0.70 | 1448 | 83 | 8 | 1524 | 115 | 4 |
| T1320 | 1.85 | 97.41 | 0.74 | 1.84 | 97.42 | 0.73 | 1837 | 40 | 0 | 2888 | 179 | 4 |

FIG. 20

| Mixer | 1802B (tip speed) | 1802A (P/V value) | 1803 |
|---|---|---|---|
| Volume V (L) | 2 | 2 | 0.2 |
| Impeller D (mm) | 65.9 | 65.9 | 31 |
| Tank diameter T (mm) | 278 | 278 | 129 |
| Max RPM | 140 | 180 | 300 |
| Power/Vol (W/m$^3$) | 20.2 | 43.0 | 43.3 |
| Tip Speed (m/s) | 0.483 | 0.621 | 0.481 |
| Tip shear (s$^{-1}$) | 4.555 | 5.857 | 9.791 |
| Mean shear (s$^{-1}$) | 3.673 | 5.355 | 5.375 |
| Reynold number | 6739 | 8664 | 3285 |

FIG. 21

| Sample | pH | | | | Protein concentration (mg/ml) | | | | Turbidity | | |
|---|---|---|---|---|---|---|---|---|---|---|---|
| | 1802A (P/V) | 1802B | 1803 | | 1802A (P/V) | 1802B | 1803 | | 1802A (P/V) | 1802B | 1803 |
| Control | 6.3 | 6.3 | 6.3 | | 21.2 | 19.2 | 17.4 | | 0.073 | 0.068 | 0.071 |
| T0 | 6.3 | 6.3 | 6.3 | | 21.3 | 19.2 | 17.2 | | 0.071 | 0.068 | 0.072 |
| T1h | 6.3 | 6.3 | 6.3 | | 21.1 | 19.1 | 17.3 | | 0.072 | 0.080 | 0.079 |
| T2h | 6.3 | 6.3 | 6.3 | | 21.3 | 19.1 | 17.3 | | 0.075 | 0.078 | 0.081 |
| T5h | 6.3 | 6.3 | 6.3 | | 21.3 | 19.1 | 17.3 | | 0.082 | 0.082 | 0.107 |
| T8h | 6.3 | 6.3 | 6.3 | | 21.3 | 19.2 | 17.4 | | 0.088 | 0.095 | 0.128 |
| T24h | 6.3 | 6.3 | 6.3 | | 21.4 | 18.9 | 17.3 | | 0.114 | 0.124 | 0.234 |
| T30h | 6.3 | 6.3 | 6.3 | | 21.4 | 19.3 | 17.4 | | 0.127 | 0.140 | 0.261 |

FIG. 22

| Sample | 1802A | | 1802B | | | 1803 | | |
|---|---|---|---|---|---|---|---|---|
| | % HMW | % Main | % LMW | % HMW | % Main | % LMW | % HMW | % Main | % LMW |
| Control | 1.0 | 99.0 | 0.0 | 2.0 | 97.5 | 0.5 | 1.7 | 97.8 | 0.6 |
| T0 | 0.9 | 99.1 | 0.0 | 2.0 | 97.6 | 0.5 | 1.7 | 97.8 | 0.5 |
| T1h | 0.9 | 99.1 | 0.0 | 2.0 | 97.6 | 0.5 | 1.7 | 97.8 | 0.5 |
| T2h | 0.9 | 99.1 | 0.0 | 2.1 | 97.4 | 0.6 | 1.7 | 97.9 | 0.5 |
| T5h | 0.9 | 99.1 | 0.0 | 1.9 | 97.6 | 0.5 | 1.7 | 97.8 | 0.5 |
| T8h | 0.9 | 99.1 | 0.0 | 1.9 | 97.6 | 0.5 | 1.6 | 97.9 | 0.5 |
| T24h | 0.8 | 99.2 | 0.0 | 1.8 | 97.7 | 0.5 | 1.6 | 98.0 | 0.5 |
| T30h | 0.8 | 99.2 | 0.0 | 1.7 | 97.7 | 0.5 | 1.5 | 98.0 | 0.5 |

FIG. 23

| Sample | 1802A | | | 1802B | | | 1803 | | |
|---|---|---|---|---|---|---|---|---|---|
| | ≥ 2 μm | ≥ 10 μm | ≥ 25 μm | ≥ 2 μm | ≥ 10 μm | ≥ 25 μm | ≥ 2 μm | ≥ 10 μm | ≥ 25 μm |
| Control | 10,380 | 2,076 | 467 | 3,529 | 572 | 123 | 2,259 | 345 | 86 |
| T0 | 12,681 | 2,489 | 505 | 7,297 | 557 | 71 | 3,411 | 502 | 77 |
| T1h | 17,002 | 1,942 | 432 | 25,760 | 1,412 | 221 | 25,666 | 721 | 140 |
| T2h | 31,769 | 2,187 | 452 | 41,921 | 1,742 | 274 | 46,362 | 661 | 150 |
| T5h | 47,749 | 2,458 | 471 | 79,725 | 2,052 | 169 | 158,826 | 1,033 | 171 |
| T8h | 65,578 | 3,617 | 678 | 114,730 | 3,150 | 194 | 242,874 | 1,317 | 139 |
| T24h | 185,249 | 5,471 | 717 | 313,824 | 7,230 | 196 | 565,041 | 1,437 | 174 |
| T30h | 221,912 | 4,575 | 469 | 355,354 | 8,142 | 172 | 866,723 | 4,880 | 176 |

FIG. 24

| Mixer | 1802A | 1803 |
|---|---|---|
| Volume V (L) | 2 | 0.2 |
| Impeller D (mm) | 65.9 | 31 |
| Tank diameter T (mm) | 278 | 129 |
| Max RPM | 360 | 780 |
| Tip Speed (m/s) | 1.242 | 1.252 |
| Tip shear (s⁻¹) | 11.713 | 25.455 |
| Mean shear (s-1) | 15.146 | 22.534 |
| Reynold number | 17329 | 8540 |

| Mixer | 1802 | 1803 |
|---|---|---|
| Volume V (L) | 2 | 0.2 |
| Impeller D (mm) | 65.9 | 31 |
| Tank diameter T (mm) | 278 | 129 |
| Max RPM | 250 | 540 |
| Tip Speed (m/s) | 0.863 | 0.867 |
| Tip shear (s⁻¹) | 8.134 | 17.623 |
| Mean shear (s-1) | 8.765 | 12.980 |
| Reynold number | 12034 | 5912 |

| Sample | pH | | Protein concentration (mg/ml) | | Turbidity | | Purity | | | | | | Particle #/ml (MFI) | | | | | |
|---|---|---|---|---|---|---|---|---|---|---|---|---|---|---|---|---|---|---|
| | | | | | | | 1802B | | | 1803 | | | 1802B | | | 1803 | | |
| | 1802B | 1803 | 1802B | 1803 | 1802B | 1803 | %HMW | %Main | %LMW | %HMW | %Main | %LMW | ≥2 μm | ≥10 μm | ≥25 μm | ≥2 μm | ≥10 μm | ≥25 μm |
| Control | 6.3 | 6.4 | 19.0 | 19.2 | 0.070 | 0.070 | 2.00 | 97.40 | 0.60 | 1.84 | 97.67 | 0.49 | 5,130 | 524 | 93 | 1,736 | 275 | 52 |
| T0 | 6.3 | 6.4 | 19.0 | 19.0 | 0.071 | 0.065 | 1.88 | 97.55 | 0.57 | 1.83 | 97.61 | 0.56 | 8,810 | 765 | 107 | 3,620 | 635 | 151 |
| T30 | 6.4 | 6.4 | 19.0 | 18.8 | 0.073 | 0.073 | 1.91 | 97.53 | 0.56 | 1.89 | 97.55 | 0.56 | 16,192 | 974 | 165 | 24,637 | 745 | 134 |
| T60 | 6.4 | 6.4 | 19.0 | 19.0 | 0.088 | 0.091 | 2.03 | 97.40 | 0.57 | 1.99 | 97.58 | 0.49 | 19,573 | 865 | 155 | 56,529 | 574 | 88 |
| T90 | 6.4 | 6.4 | 19.1 | 18.9 | 0.085 | 0.095 | 1.95 | 97.56 | 0.49 | 2.05 | 97.47 | 0.49 | 27,819 | 959 | 192 | 78,551 | 574 | 127 |
| T150 | 6.4 | 6.4 | 18.9 | 18.8 | 0.082 | 0.120 | 1.97 | 97.36 | 0.67 | 2.28 | 97.23 | 0.49 | 43,166 | 1,510 | 200 | 143,526 | 1,303 | 209 |
| T240 | 6.4 | 6.4 | 19.1 | 18.9 | 0.080 | 0.152 | 2.09 | 97.39 | 0.52 | 2.63 | 96.77 | 0.59 | 63,533 | 1,217 | 142 | 248,584 | 966 | 81 |
| T300 | 6.4 | 6.4 | 19.1 | 18.9 | 0.089 | 0.177 | 2.16 | 97.24 | 0.59 | 2.81 | 96.62 | 0.58 | 78,697 | 1,172 | 189 | 313,102 | 1,113 | 138 |
| T360 | 6.4 | 6.4 | 19.1 | 18.7 | 0.094 | 0.219 | 2.02 | 97.42 | 0.56 | 2.99 | 96.43 | 0.58 | 88,562 | 1,530 | 157 | 400,984 | 1,375 | 169 |
| T420 | 6.4 | 6.4 | 19.1 | 18.9 | 0.099 | 0.263 | 2.15 | 97.26 | 0.59 | 3.10 | 96.40 | 0.50 | 97,854 | 1,909 | 207 | 490,344 | 1,433 | 195 |
| T480 | 6.4 | 6.4 | 19.1 | 18.9 | 0.099 | 0.337 | 2.02 | 97.47 | 0.51 | 3.58 | 95.84 | 0.58 | 105,629 | 1,739 | 56 | 596,324 | 1,656 | 155 |
| T1440 | 6.4 | NA | 19.1 | NA | 0.133 | NA | 2.00 | 97.46 | 0.53 | NA | NA | NA | 127,886 | 5,973 | 880 | NA | NA | NA |

FIG. 27

SYSTEMS AND METHODS FOR PRODUCING A MIXER

This application claims priority to U.S. Provisional Application No. 63/062,129, filed Aug. 6, 2020, U.S. Provisional Application No. 63/085,080, filed Sep. 29, 2020, and U.S. Provisional Application No. 63/150,540, filed Feb. 17, 2021, the contents of each of which are incorporated herein by reference in their entireties.

BACKGROUND

Biopharmaceutical products can include large, unstable molecules. For example, biopharmaceutical proteins can have a specific three-dimensional ("3D") structure involved in their biological activity. Due to their instability, preventing degradation of during their manufacture is a challenge. A number of external factors can cause degradation. For example, mixing biopharmaceutical products into aqueous formulations can degrade them due to mechanical agitation, high shear forces, adsorption, and aggregation.

SUMMARY

The following presents a simplified summary of the disclosed subject matter in order to provide a basic understanding of some aspects of the disclosed subject matter. This summary is not intended to identify key or critical elements of the disclosed subject matter or delineate the scope of the claimed subject matter.

In some implementations, a system for producing a small-scale mixer is provided. The system includes a three-dimensional printer configured to produce the small-scale mixer having first dimensions based on a respective dimension of an at-scale mixer and based on second dimensions independent of the dimensions of the at-scale mixer. The system also includes a smoothing apparatus that smooths a surface of the small-scale mixer.

In some implementations, a method for producing a small-scale mixer is provided. The method includes obtaining dimensions of an at-scale mixer. The method also includes determining first dimensions of the small-scale mixer based on respective dimensions of the at-scale mixer. The method further includes determining second dimensions of the small-scale mixer independent of the dimensions of the at-scale mixer. Additionally, the method includes generating the small-scale mixer using the first dimensions and the second dimensions.

DRAWINGS

FIG. 3A shows a top view of an example of an impeller of an at-scale mixer in accordance with aspects of the present disclosure.

FIG. 3B shows a side view of an example of an at-scale mixer impeller in accordance with aspects of the present disclosure.

FIG. 4A shows a top view of an example of a small-scale mixer impeller in accordance with aspects of the present disclosure.

FIG. 4B shows a side view of an example of a small-scale mixer impeller in accordance with aspects of the present disclosure

FIGS. 7, 8, and 9 show tables illustrating example scaling factors for a small-scale mixer impeller in accordance with aspects of the present disclosure.

Figure 10:
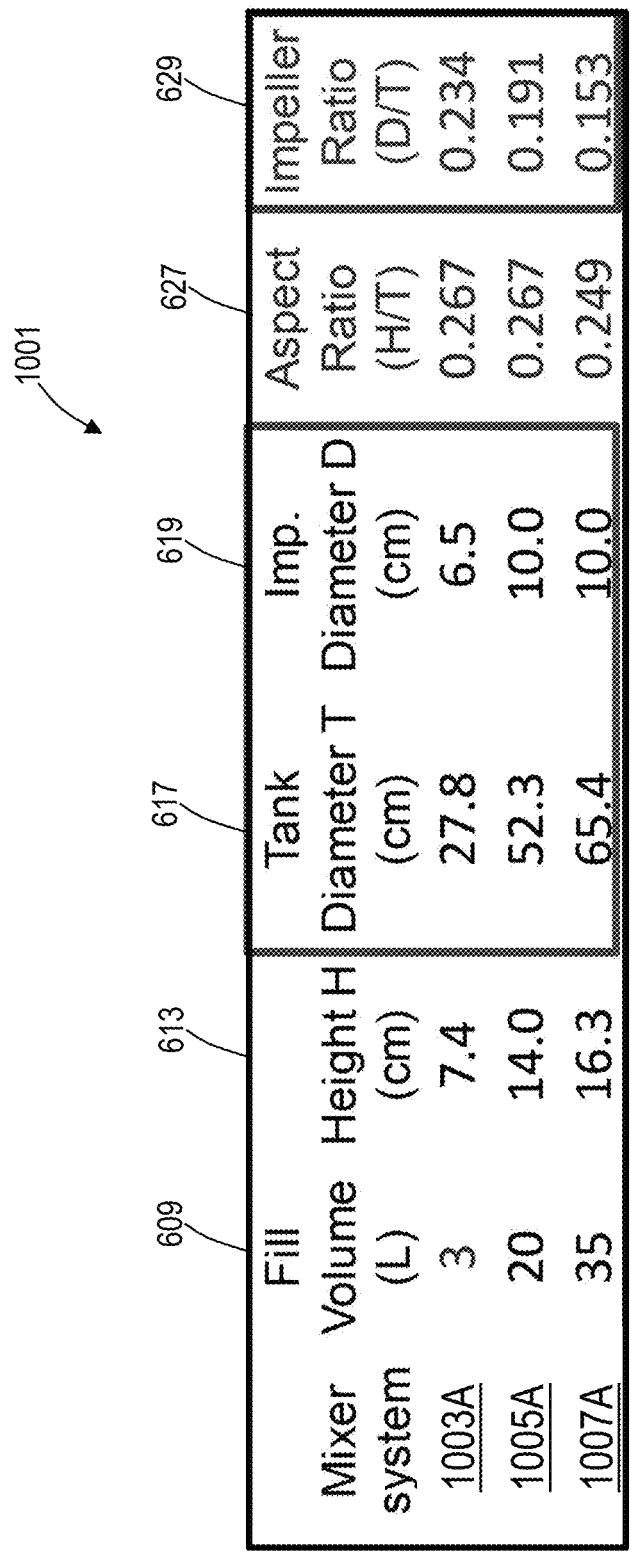

FIG. 10 shows a table illustrating ratios between example dimensions of at-scale mixer impellers in accordance with aspects of the present disclosure.

FIG. 11 shows a table illustrating example differences between target dimensions and actual dimensions of small-scale mixer tanks in accordance with aspects of the present disclosure.

Figure 12:
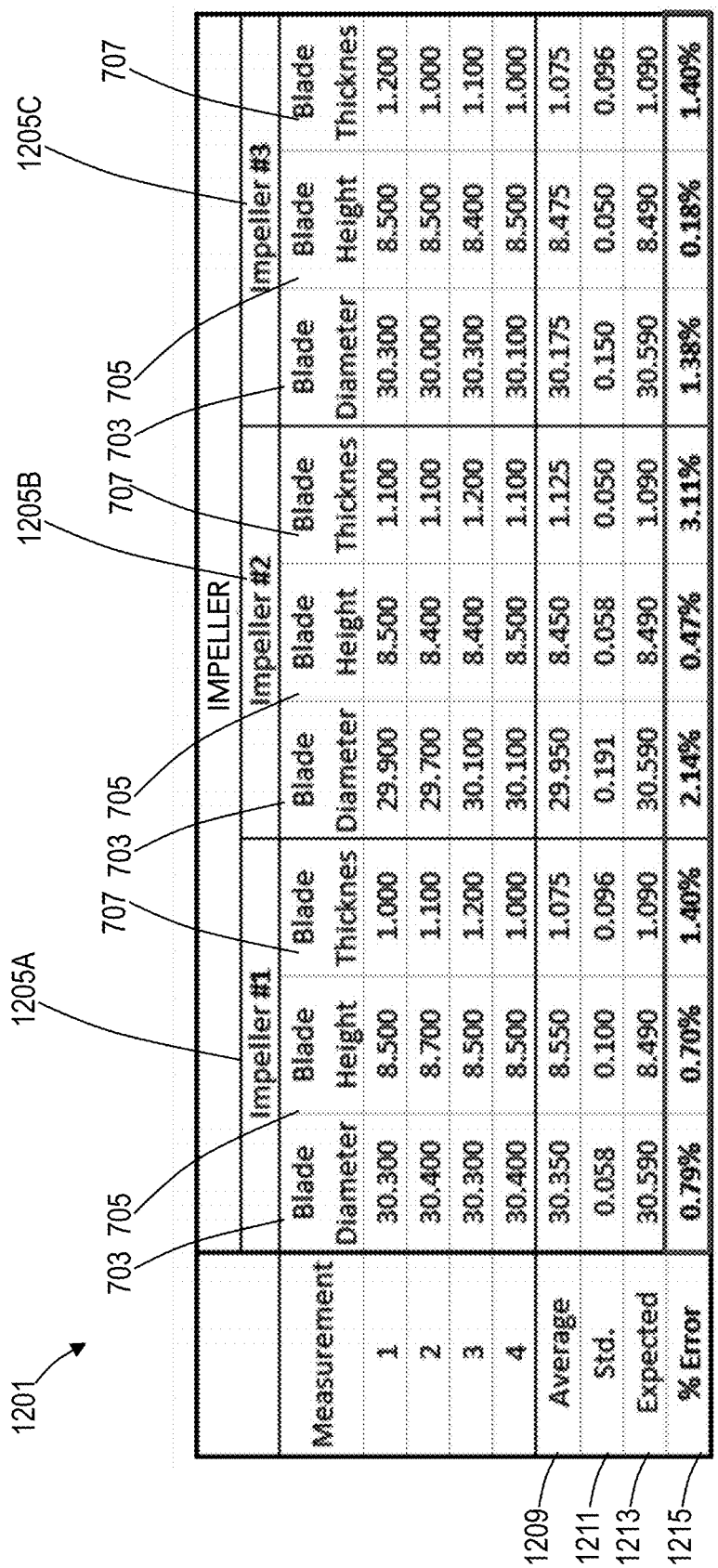

FIG. 12 shows a table illustrating differences between example expected dimensions and actual dimensions of small-scale mixer impellers generated in accordance with aspects of the present disclosure.

Figure 13:
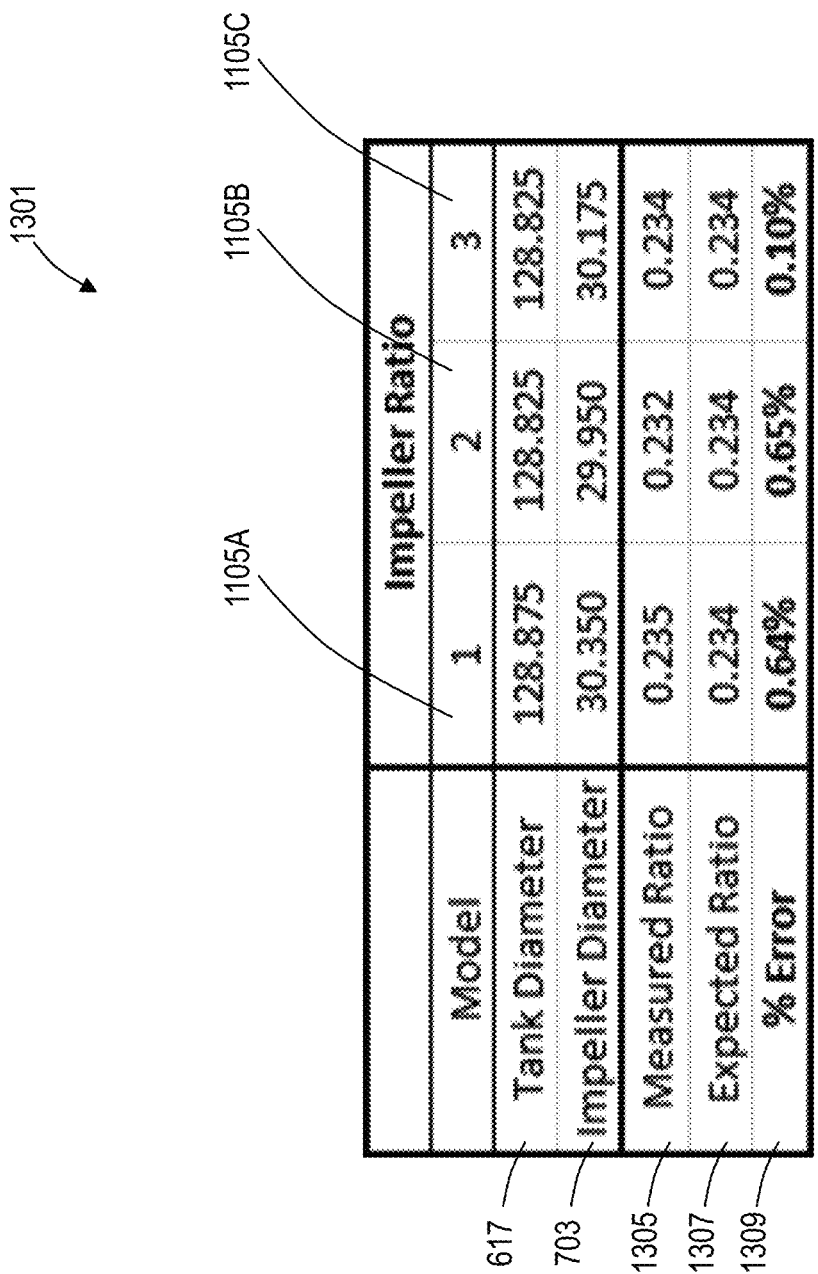

FIG. 13 shows a table illustrating differences between example expected dimensions and actual dimensions of small-scale mixer impellers generated in accordance with aspects of the present disclosure.

FIG. 14 shows a table illustrating differences between example target speeds and actual speeds of a small-scale mixer impeller in accordance with aspects of the present disclosure.

Figure 15:
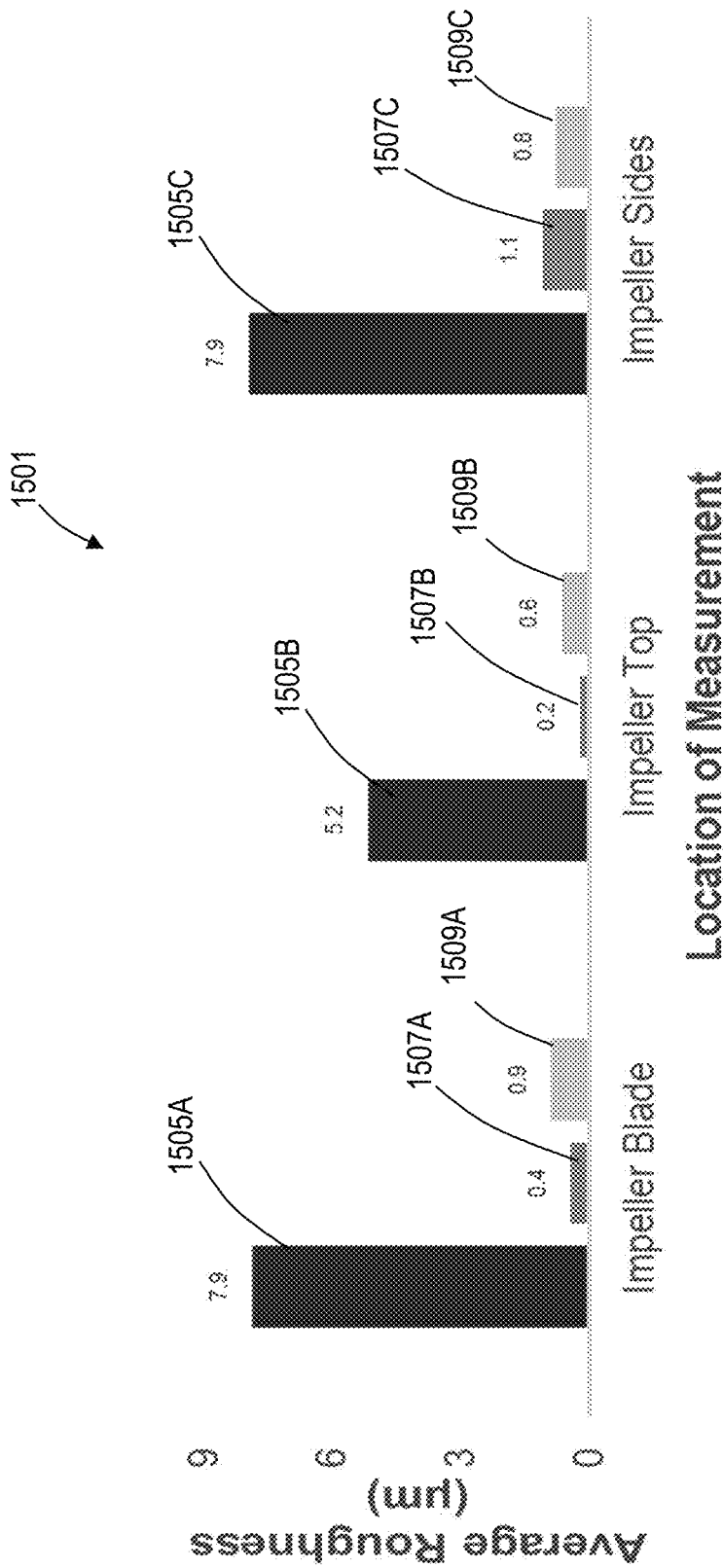

FIG. 15 shows a chart illustrating comparisons between average surface roughness of an example at-scale mixer impeller and an example small-scale mixer impeller accordance with aspects of the present disclosure.

Figure 16:
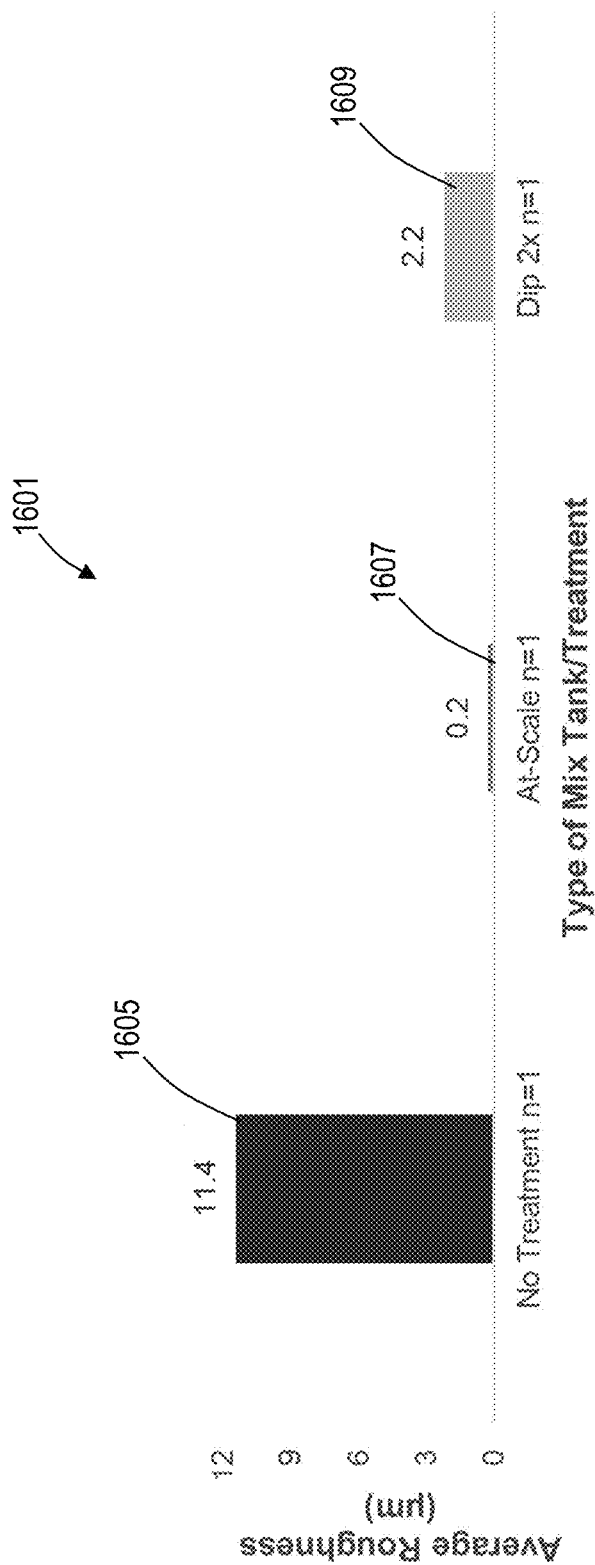

FIG. 16 shows a chart illustrating example comparisons between tank surface roughness of an example at-scale mixer tank and an example small-scale mixer tank accordance with aspects of the present disclosure.

Figure 17:
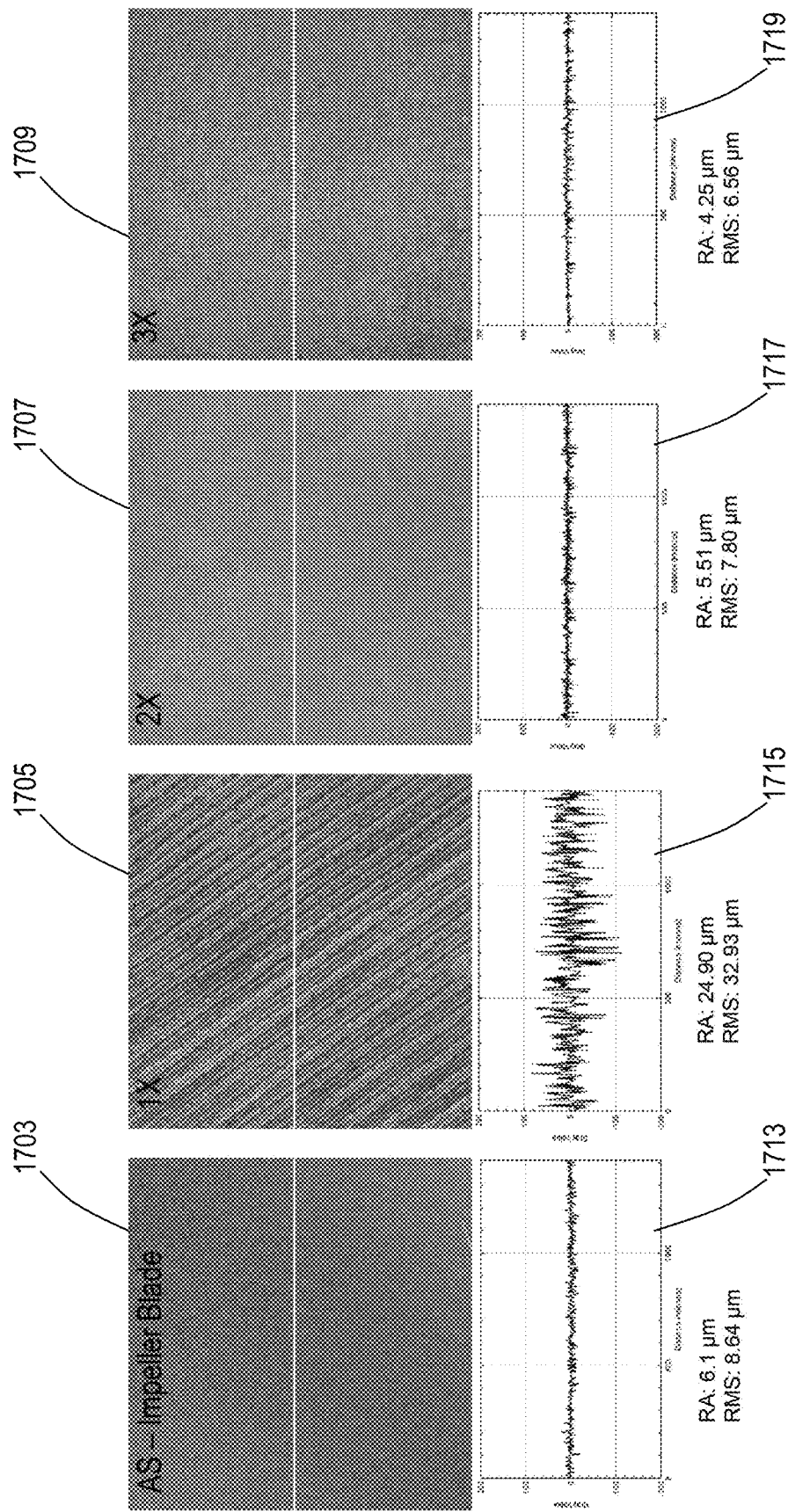

FIG. 17 shows images illustrating surface roughness of an example small-scale mixer impeller in accordance with aspects of the present disclosure.

Figure 18:
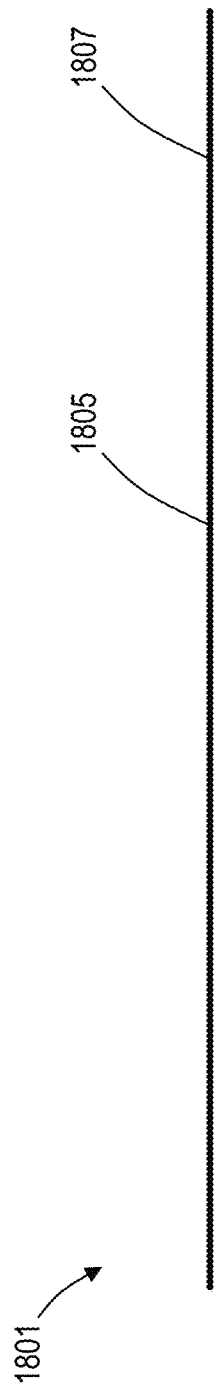

FIGS. 18, 19, and 20 illustrate an example validation process in accordance with aspects of the present disclosure.

FIGS. 21, 22, 23, and 24 illustrate an example validation process in accordance with aspects of the present disclosure.

FIGS. 25, 26, and 27 illustrate an example validation process in accordance with aspects of the present disclosure.

DETAILED DESCRIPTION

The present disclosure generally relates to mixing apparatuses. More particularly, the present disclosure relates to mixing apparatuses for manufacturing pharmaceutical products. Apparatuses and methods consistent with the present disclosure provide small-scale mixing apparatuses. In some implementations, the small-scale mixing apparatuses are produced using 3D printing.

A small-scale mixer in accordance with aspects of the present disclosure can have first dimensions based on dimensions of a respective at-scale mixer and second dimensions independent of the respective at-scale mixer. In some implementations, the first dimensions are scaled from the respective dimensions of the at-scale mixer. The second dimensions can prevent degradation of pharmaceutical products blended in the small-scale mixer. For example, the second dimensions can limit friction, particle generation, and shear forces imparted to the pharmaceutical products. In some implementations, the second features include impeller blade smoothness, impeller blade thickness, and impeller hub size. In some implementations, the hub size of the small-scale impeller is the same or similar to the hub size of the at-scale impeller such that an impeller drive unit adapted to drive the at-scale impeller can also drive the small-scale impeller. Additionally, in some implementations the second dimensions of the small-scale impeller are adapted to withstand sheer forces imparted by the at-scale drive unit.

Figure 1:
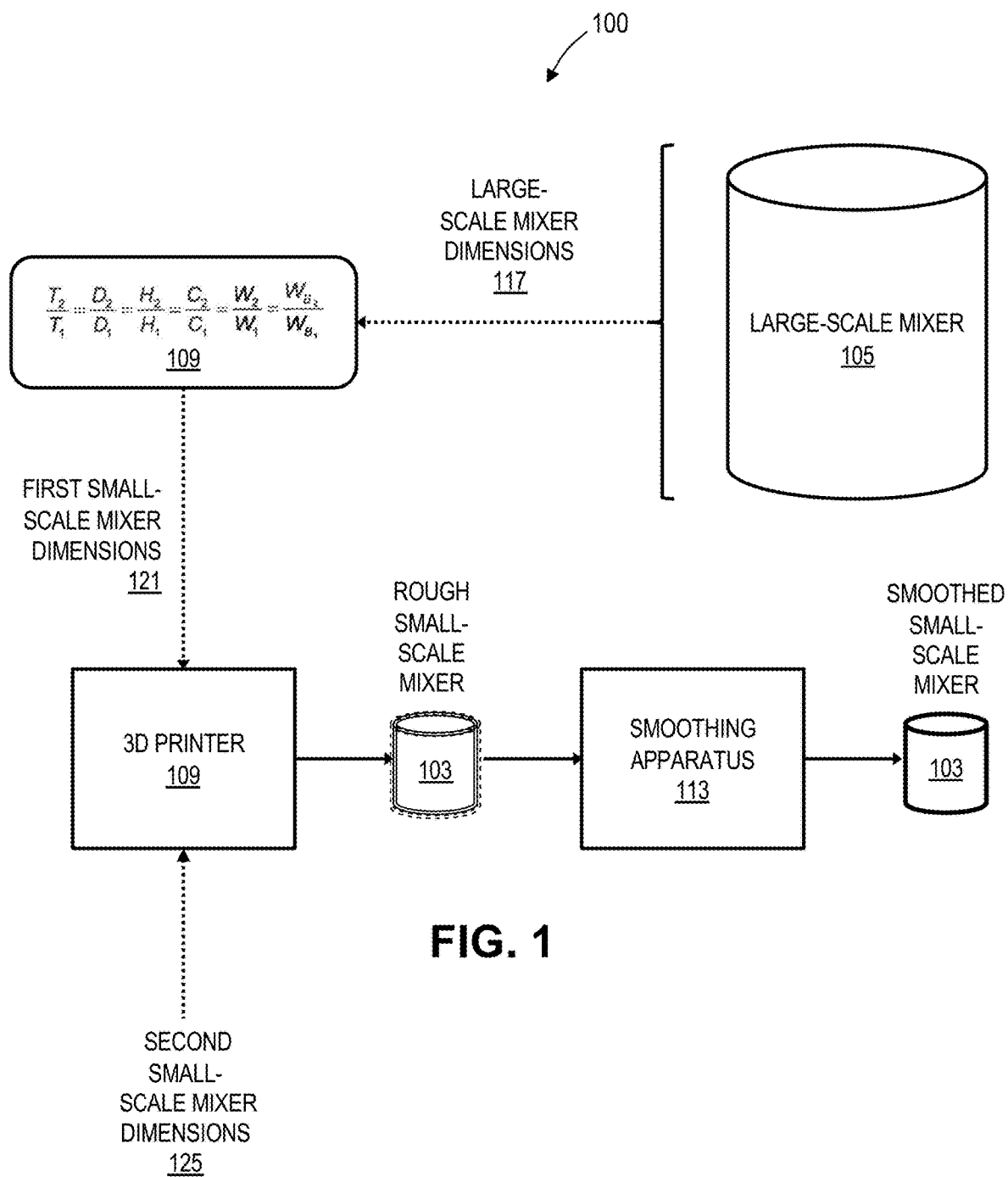
FIG. 1 shows a block diagram illustrating an example of an environment for implementing systems and methods in accordance with aspects of the present disclosure.

FIG. 1 shows a block diagram illustrating an exemplary environment 100 for implementing systems and methods in accordance with aspects of the present disclosure. The environment 100 can include a small-scale mixer 103, an at-scale mixer 105, a 3D printer 109, and a smoothing apparatus 113. The at-scale mixer 105 can be any type of mixing apparatus. In some implementations, the at-scale mixer 105 can be configured for pharmaceutical product manufacturing. For example, the at-scale mixer 105 can mix pharmaceutical ingredients from intermediate to final drug products and for the preparation of process solutions, such as buffers and media. In accordance with aspects of the present disclosure, the at-scale mixer 105 can have a fill volume greater than or equal to about 10 liters. In some implementations, the at-scale mixer 105 can have a fill volume between about 10 liters and about 1000 liters. It is understood that an actual capacity of a mixer may exceed its indicated capacity. For example, the actual capacity of a mixer (e.g., 110 liters) may exceed its indicated capacity (e.g., 100 liters) by about 10%. In some implementations, the at-scale mixer 105 can comprise a tank, an impeller, a single use mixing bag (e.g., "bio-container"), and a separate interchangeable drive unit. For example, the at-scale mixer 105 can be a Mobius® Single-Use Mixing Systems by Merck KGaA of Darmstadt, Germany. In some implementations, dimensions 117 of the at-scale mixer 105 can include the following: impeller clearance off bottom of mixer ("$C_2$"), impeller diameter ("$D_2$"), liquid level ("$H_2$"), rotational speed ("$N_2$"), tank diameter ("$T_2$"), blade width ("$W_2$"), and baffle width ("$WB_2$").

The small-scale mixer 103 can have dimensions 121 proportional to the dimensions 117 of the at-scale mixer 105. In some implementations, the small-scale mixer 103 can have a fill volume less than or equal to about 2 liters. In some implementations, the small-scale mixer 103 can have a fill volume between about 0.5 liters and about 2 liters. For example, the small-scale mixer 103 can have a fill volume of about 1 liter. It is understood that an actual capacity of the small-scale mixer may exceed its targeted capacity (e.g., by about 10%). The dimensions 121 of the small-scale mixer 103 can include the following: impeller clearance off bottom of mixer ("$C_1$"), impeller diameter ("$D_1$"), liquid level ("$H_1$"), rotational speed ("$N_1$"), tank diameter ("$T_1$"), blade width ("$W_1$"), and baffle width ("$WB_1$"). In accordance with aspects of the present disclosure, the dimensions 121 of the small-scale mixer 103 are proportionally the same as those of the at-scale mixer 105. In some implementations, the dimensions of a small-scale mixer 103 are related to the dimensions of the at-scale mixer 105 by an equal scaling factor or a substantially equal scaling factor. For example, as illustrated by block 109 in FIG. 1, the scaling factor can be a ratio between: $C_1/C_2$, $D_1/D_2$, $H_1/H_2$, $N_1/N_2$, $T_1/T_2$, $W_1/W_2$, and $WB_1/WB_2$, wherein the ratios have equal values or substantially equal values. In some implementations, the scale factor can be a value greater than about 2.0. For example, the scale factor can be about 2.2, about 3.7, about 4.6, about 5.8, or about 7.9.

The 3D printer 109 can be a conventional 3D printing system, which can use fused filament fabrication, stereolithography, selective laser sintering, selective laser melting, electronic beam melting, or other suitable 3D printing technique. In some implementations, the 3D printer 109 can print 3D structures using PC (Polycarbonate), ABS (acrylonitrile butadiene styrene), polycarbonate (PC), PLA (polylactic acid), PET (polyethylene terephthalate), nylon, metal, glass/PET, or other suitable materials.

The smoothing apparatus 113 can be configured to deburr and smooth objects, such as those generated by the 3D printer 109. The smoothing apparatus 113 can include mechanical and chemical smoothing devices. In some implementations, the smoothing apparatus 113 can include one or more devices having one or more friction heads configured to deburr, sand, and polish the 3D shapes. Additionally, the smoothing apparatus 113 can include a solvent bath that polishes the 3D shapes formed from materials used by the 3D printer 109. For example, the solvent bath can use acetone, dichloromethane, or other solvent to smooth, for example, ABS or polycarbonate. In some implementations, the rough small-scale mixer 103 generated by the 3D printer 109 is polished using vapor produced by the solvent. In other implementations, the rough small-scale mixer 103 is polished by dipping it directly into a pool of the solvent.

Still referring to FIG. 1, the illustration of the environment 100 shows an example of a functional flow for producing the small-scale mixer 103 based on an at-scale mixer 105 using the 3D printer 109 and the smoothing apparatus 113. As shown by block 109, the dimensions 117 of the at-scale mixer 105 (e.g., $C_2$, $D_2$, $H_2$, $N_2$, $T_2$, $W_2$, and $WB_2$) can be translated into the dimensions 121 of the small-scale mixer 103 (e.g., $C_1$, $D_1$, $H_1$, $N_1$, $T_1$, $W_1$, and $WB_1$) using a same scaling factor for the individual dimensions, such that $C_1/C_2=D_1/D_2=H_1/H_2$, $N_1/N_2=T_1/T_2$, $=W_1/W_2=WB_1/WB_2$. Additionally, second dimensions 125 of the small-scale mixer can be determined. The second dimensions 125 can be determined by, for example, modeling and simulation using conventional computational fluid dynamics techniques. Using the first and second small-scale mixer dimensions 121 and 125, the 3D printer 109 can produce the small-scale mixer 103. In some implementations, a tank and an impeller of the small-scale mixer 103 can be generated as a single piece. In other implementations, the tank and the impeller can be generated separately.

Further, as illustrated in FIG. 1, surfaces the small-scale mixer 103 output by the 3D printer 109, including the tank and the impeller, can be a rough due to imperfections, such as burrs, rough edges, and the like. The imperfections can result from the 3D printing process and can degrade pharmaceutical products during mixing, for example, by causing friction, particle generation, and shear forces. The smoothing apparatus 113 can process the rough small-scale mixer 103 to remove the imperfections and can smooth the surface of the small-scale mixer 103.

Figure 2:
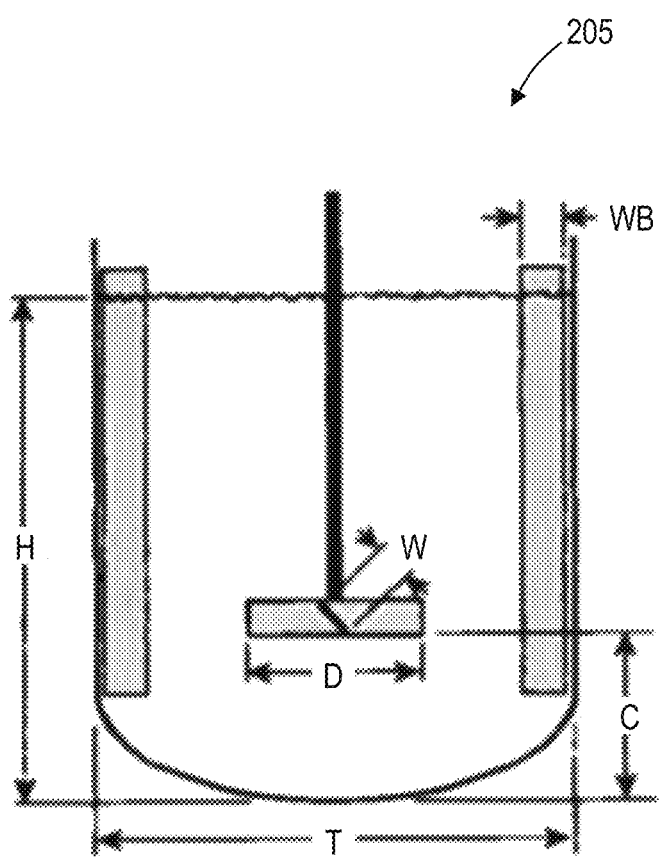
FIG. 2 shows a cutaway side view of a mixer illustrating examples of physical dimensions of the mixer in accordance with aspects of the present disclosure.

FIG. 2 shows a cutaway side view of an example of a mixer 205 illustrating dimensions in accordance with aspects of the present disclosure. The mixer 205 and its dimensions can be the same or similar to those discussed above. For example, the dimensions of the mixer 205 can include the following: impeller clearance off bottom of mixer (C), impeller diameter (D), liquid level (H), tank diameter (T), blade width (W), and baffle width (WB). The dimensions C, D, H, N, T, W, and WB) of the mixer 205 can correspond to dimensions of the above-described small-scale mixer (e.g., small-scale mixer 103 dimensions $C_1$, $D_1$, $H_1$, $N_1$, $T_1$, $W_1$, and $WB_1$) and at-scale mixer (e.g., at-scale mixer 105 dimensions $C_2$, $D_2$, $H_2$, $N_2$, $T_2$, $W_2$, and $WB_2$).

FIG. 3A shows a top view of an example of an impeller 305 of an at-scale mixer in accordance with aspects of the present disclosure. FIG. 3B shows a side view of the impeller 305 in accordance with aspects of the present disclosure. The impeller 305 can be the same or similar to that of the at-scale mixer described above (e.g., at-scale mixer 105). The impeller 305 can have an impeller diameter ($D_2$) and a blade width ($W_2$), which can be the same as the dimensions described above. Additionally, the impeller 305 can have a blade height ($BH_2$). Further, the impeller 305 can have a hub 309 having a hub diameter ($HD_2$) and a hub height ($HH_2$).

FIG. 4A shows a top view of an example of an impeller 405 of a small-scale mixer in accordance with aspects of the present disclosure. FIG. 4B shows a side view of the impeller 405 in accordance with aspects of the present disclosure. The impeller 405 can be the same or similar to that of the small-scale mixer described above (e.g., small-scale mixer 103). The impeller 405 can have an impeller diameter ($D_1$) and a blade width ($W_1$) which can be the same as the dimensions described above. Additionally, the impeller 405 can have a blade height ($BH_1$). Further, the impeller 405 can have a hub 409 having a hub diameter ($HD_1$) and a hub height ($HH_1$). As described above, the impeller diameter ($D_1$) and the blade width ($W_1$) of the impeller 405 can be proportional to the impeller diameter ($D_2$) and the blade width ($W_2$) of the impeller 305 based on a common scaling factor. In some implementations, different from the dimensions of the impeller diameter ($D_1$) and the blade width ($W_1$), the hub diameter ($HD_1$) and the hub height ($HH_1$) of the hub 409 can be independent of the hub diameter ($HD_2$) and the hub height ($HH_2$) of the hub 309. Rather than being based on the dimensions of the hub diameter ($HD_2$) and the hub height ($HH_2$) of the hub 309, the dimensions of the hub diameter ($HD_1$) and the hub height ($HH_1$) of the hub 409 can be configured to limit friction, particle generation, and shear forces imparted to pharmaceutical products during mixing. Additionally, in some implementations, surfaces of the impeller 405 can be as smooth or substantially smoother than those of the impeller 305.

Figure 5:
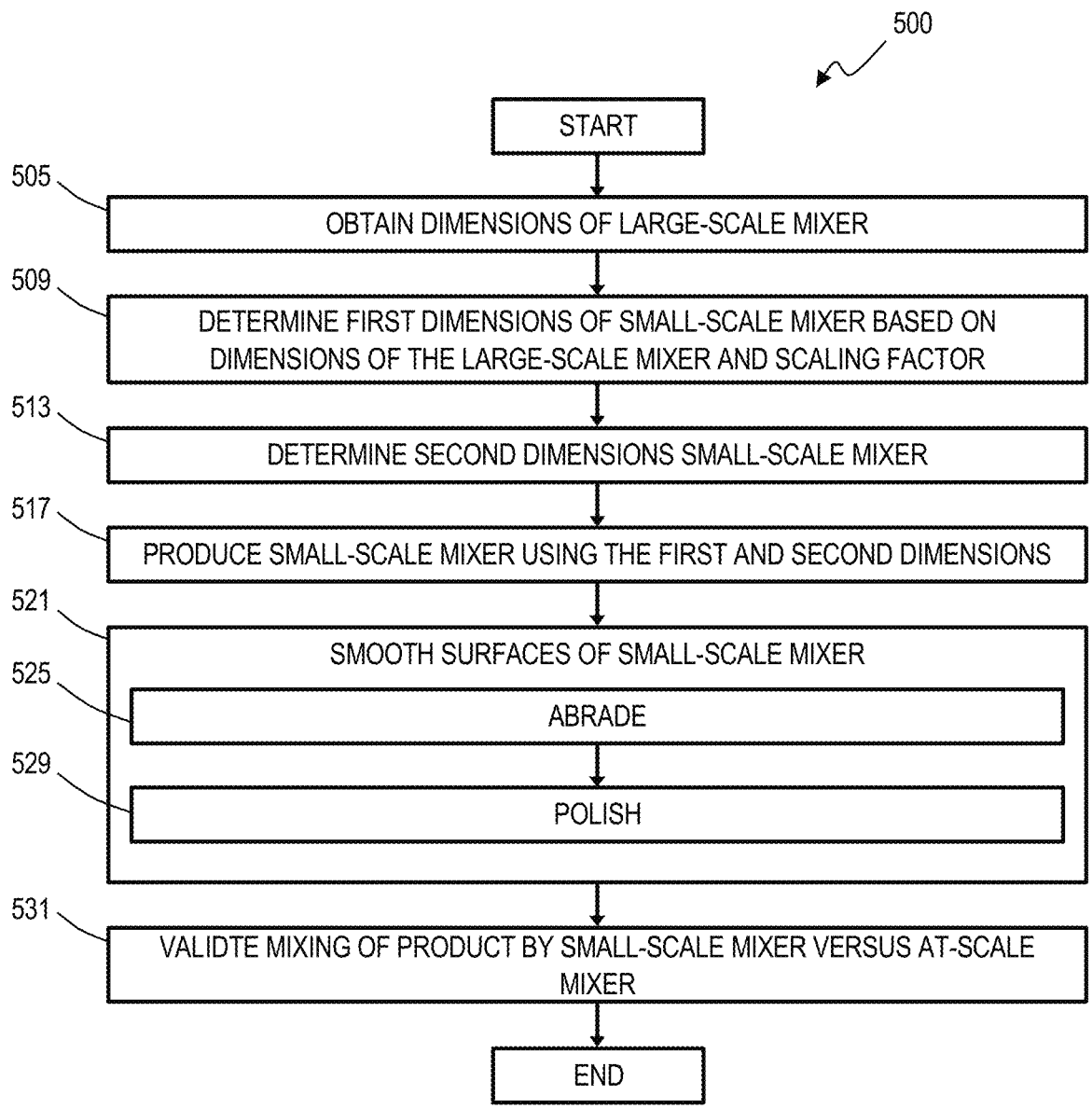
FIG. 5 shows a flow block diagram illustrating an example of a method for producing a small-scale mixer in accordance with aspects of the present disclosure.

FIG. 5 shows a flow block diagram illustrating an example of a method 500 for producing a small-scale mixer in accordance with aspects of the present disclosure. At block 505, the method 500 includes obtaining dimensions (e.g., $C_2$, $D_2$, $H_2$, $N_2$, $T_2$, $W_2$, $HD_2$ and $HH_2$) of an at-scale mixer (e.g., at-scale mixer 105). The dimensions can be determined from reference documentation, manually measured, or automatically measured (by, e.g., optical scanning).

Figure 6:
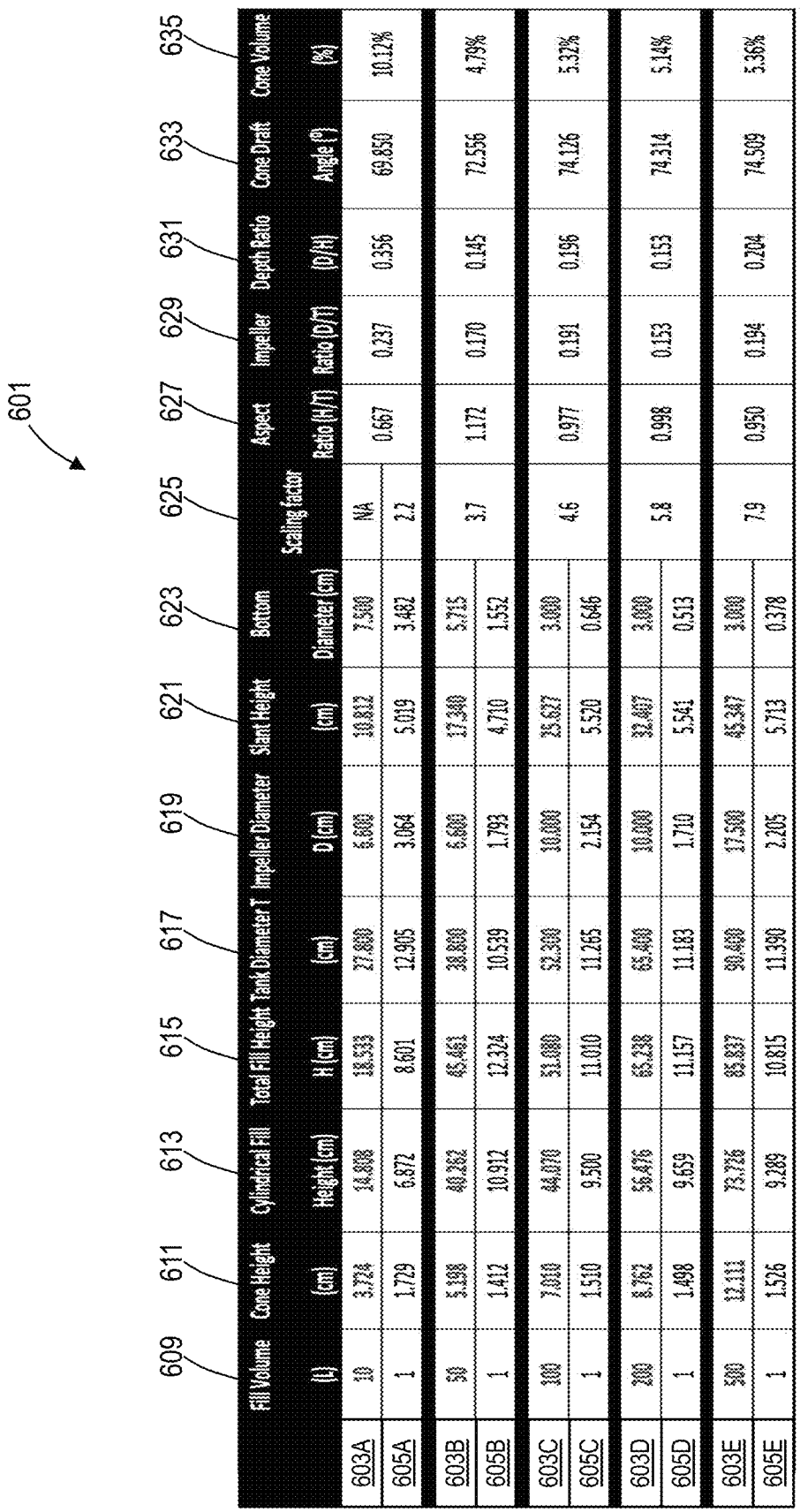
FIG. 6 shows a table illustrating example scaling factors for small-scale mixers in accordance with aspects of the present disclosure.

At block 509, the method 500 can include determining first dimensions (e.g., $C_1$, $D_1$, $H_1$, $N_1$, $T_1$, $W_1$, $HD_1$ and $HH_1$) of a small-scale mixer (e.g., small-scale mixer 103) to be produced based on the dimensions of the at-scale mixer determined at block 505. In some implementations, all the first dimensions of the small-scale mixer are determined using a same scaling factor. The value of the scaling factor can be a ratio between a dimension of the at-scale mixer and a respective dimension of the small-scale mixer. For example, as illustrated in FIG. 6, the height ($H_2$) of the at-scale mixer can be 18.533 cm and the height ($H_1$) of small-scale mixer can be 8.601 cm. Accordingly, the scaling factor can be about 2.2 (i.e., 18.533/8.601). It is understood that other dimensions (e.g., $C_2$, $D_2$, $H_2$, $N_2$, $T_2$, $W_2$, $BH_2$, $HD_2$, and $HH_2$) could be used to determine respective dimensions of the small-scale mixer (e.g., $C_1$, $D_1$, $H_1$, $N_1$, $T_1$, $W_1$, $BH_1$, $HD_1$, and $HH_1$) using the same scaling factor.

In some implementations, the scaling factor can be selected to obtain a target fill volume of the small-scale mixer. For example, the scaling factor can be selected to provide a fill volume of 1 liter.

At block 513, the method 500 can determine second dimensions of the small-scale mixer. In some implementations, the second dimensions are independent of the dimensions of the at-scale mixer. The second dimensions can be determined by, for example, modeling and simulation using computational fluid dynamics techniques to determine physical forces on an impeller of the small-scale mixer (e.g., impeller 405) and shear forces on a solution by the impeller over various rotational velocities, fluid densities, and temperatures.

At block 517, using the first and second small-scale mixer dimensions determined at blocks 509 and 513, the method 500 can produce the small-scale mixer 103 using a 3D printer (e.g., 3D printer 109). As noted above, the 3D printer can generate the small-scale mixer by fused filament fabrication using materials, including ABS, PLA, PET, nylon, metal, glass/PET, or other suitable materials. It is understood that other 3D printing techniques can be used to generate the small-scale mixer.

At block 521, the method 500 can include smoothing the small-scale mixer produced at block 517 using a smoothing apparatus (e.g., smoothing apparatus 113). Smoothing the small-scale mixer can include, at block 525, mechanically abrading the surface to remove burrs, rough edges, and to polish the surface. Additionally, at block 529, smoothing the small-scale mixer can include chemically polishing the surface of the small-scale mixer. For example, the smoothing can include dipping the small-scale mixer in bath of solvent, such as acetone, one or more times. In some implementations, the dipping is limited to two dips for a total of less than 15 seconds. Additionally, in some implementations, the dipping is limited to two dips of less that 10 seconds total. For example, the small-scale mixer can be dipped into the solvent bath for five seconds, dried for about 10 minutes, and dipped a second time for an additional five seconds.

Additionally, in some implementations, the method 500 can include validating mixing of a product by the small-scale mixer verses the corresponding large-scale mixer. As described in greater detail below with regard to FIGS. 18-27, the validation can include mixing the product for a period of time (e.g., 24 hours) using the at-scale mixer and the small-scale mixer, periodically sampling the product from the at-scale mixer and the small-scale mixer, and determining whether a quality of the product has substantial differences in any of pH, protein concentration, surfactant density, turbidity, purity, and particle density based on comparisons of the respective samples.

FIG. 6 shows a table 601 illustrating example scaling factors for a small-scale mixer in accordance with aspects of the present disclosure. In particular, table 601 relates dimensions of example small-scale mixers 603A, 603B, 603C, 603D, and 603E with respective dimensions of at-scale mixers 605A, 605B, 605C, 605D, and 605E. The dimensions include associations between fill volume (L) 609, cone height 611, cylindrical fill height 613, total fill height (H) 615, tank diameter (T) 617, impeller diameter (D) 619, slant height 621, and bottom diameter 623. The respective dimensions of the small-scale mixers 603A-603E and the at-scale mixers 605A-605E can be associated by corresponding scaling factors 625. As described previously herein, the ratios between the dimensions 613-623 of the respective small-scale mixers 603A-603E and the at-scale mixers 605A-605E can be substantially the same scaling factors 625. For example, the fill volume (L) 609, cone height 611, cylindrical fill height 613, total fill height (H) 615, tank diameter (T) 617, impeller diameter (D) 619, slant height 621, and bottom diameter 623 of the small-scale mixer 603A and the at-scale mixer 605A can be scaled using the same scaling factor 625, such as 2.2. The dimensions 609-623 of the small-scale mixers 603B-603E and corresponding at-scale mixers 605B-605E have scaling factors of 3.7, 4.6, 5.8, and 7.9 respectively.

FIGS. 7, 8, and 9 show tables 701, 801, and 901 illustrating example scaling factors 625 for determining dimensions of impeller diameter 703, impeller height 705, and impeller thickness 707 of example small-scale mixer impellers 405 based on respective dimensions of corresponding at-scale mixer impellers 305 in accordance with aspects of the present disclosure. The dimensions 703, 705 and 707 of the small-scale mixer impellers 405 and corresponding at-scale mixers impellers 305 have scaling factors of 3.7, 4.6, 5.8, and 7.9 respectively, as described above.

FIG. 10 shows a table 1001 illustrating ratios between impeller dimensions of example at-scale mixer impellers in accordance with aspects of the present disclosure. Table 1001 associates at-scale mixers 1003A, 1005A, and 1007A, with respective tank fill volumes (L) 609, tank heights (H) 613, tank diameters (T) 617, impeller diameters (D) 619, tank aspect ratios (H/T) 627, and impeller ratios (D/T) 629. The at-scale mixers 1003A, 1005A, and 1007A, the tank fill volumes 609, the tank heights 613, the tank diameters 617, the impeller diameters 619, the tank aspect ratios 627, and the impeller ratios 629 can be the same or similar to those previously discussed above. In some implementations, the at-scale mixers 1003A, 1005A, and 1007A can be mixers of a same type, product, or system (e.g., mixers from a same manufacturer) having different capacities. As illustrated in FIG. 10, the at-scale mixers 1003A, 1005A, and 1007A can have respective impeller ratios 629, such as about 0.234, about 0.191, and about 0.153. In some implementations, the dimensions of an impeller of a small-scale mixer (e.g., impeller 405) is based on one of the at-scale mixers 1003A, 1005A, and 1007A having the greatest impeller ratio 629 to improve shear stress on the impeller.

FIG. 11 shows a table 1101 illustrating reproducibility of example small-scale mixers 1105A, 1105B, 1105C, and 1105D generated in accordance with aspects of the present disclosure. The table 1101 associates the measurements of respective tank diameters (T) 617 and cylinder fill heights 613 measure for the small-scale mixers 1105A-1105D. Additionally, for the tank diameter 617 and cylinder fill height 613 for the tanks 1105A-1105D, table 1101 illustrate averages 1109, standard deviation 1111, expected measurement 1113, and percent error 1115 of the average measurement 1109 from the expected measurements 1113 of the tank diameter 617 and cylinder fill height 613. For example, for tank 1105A, the table 1101 shows the average 1109 of the measured tank diameters 617 is 128.875 cm and has a standard deviation 1111 of the measured tank diameters 617 is 0.005. Further, the average 1109 of the measured tank diameters 617 is 128.875, which is a percent error 1115 of 0.13% from the expected measurements 1113 of the tank diameter 617 of 129.048 cm.

FIG. 12 shows a table 1201 illustrating reproducibility of example impellers (e.g., impeller 405) of small-scale mixers 1205A, 1205B, and 1205C in accordance with aspects of the present disclosure. The table 1201 associates measurements of respective impeller diameters (D) 703, blade heights (BH) 705, and blade thicknesses (W) 707 for the impellers. Additionally, for the impeller diameters (D) 703, blade heights (BH) 705, and blade thicknesses (W) 707 of the impellers 1205A-1205C, table 1201 illustrates averages 1209, standard deviation 1211, expected measurement 1213, and percent error 1215 of the average measurement 1109 from the expected measurements 1213 of the impeller diameters (D) 703, blade heights (BH) 705, and blade thicknesses (W) 707. For example, for tank 1205A, the table 1201 shows the average 1209 of the measured impeller diameter 703 is 30.350 mm and a standard deviation 1111 of the measured impeller diameter 703 is 0.058. Further, the average 1209 of the measured impeller diameter 703 is 30.350, which is a percent error 1215 of 0.79% from the expected measurements 1213 of the impeller diameter 703 of 30.590 mm.

FIG. 13 shows a table 1301 illustrating differences between measured ratios 1305 between impeller diameter 703 and tank diameter 617 for example at-scale mixers 1105A, 1105B, and 1105C and expected ratios 1307. Further, for the tank diameters 617 and the impeller diameters (D) 703, table 1301 illustrates percent error 1309 between the measured ratio 1305 and the expected ratio 1307. For example, for at-scale mixer 1105A, the table 1301 shows the measured ratio 1305 is 0.235, the expected ratio is 0.234, and the error is 0.64%

FIG. 14 shows a table 1401 illustrating examples differences between setting speed 1403 (rpm) and measured speed 1405 (rpm) of a small-scale mixer impeller in accordance with aspects of the present disclosure.

FIG. 15 shows a bar chart 1501 illustrating examples a comparison between average surface roughness of an at-scale mixer impeller (e.g., at-scale mixer impeller 305 of at-scale mixer 105), of a small-scale mixer impeller (e.g., small-scale mixer impeller 405 of small-scale mixer 103) before smoothing, and of the small-scale mixer impeller after smoothing in accordance with aspects of the present disclosure. More specifically, bars 1505A, 1505B, and 1505C illustrate the average roughness of the small-scale mixer impeller before smoothing measured at the impeller blade, impeller top, and impeller sides, respectively. Bars 1507A, 1507B, and 1507C illustrate the average roughness of the at-scale mixer impeller measured at the impeller blade, impeller top, and impeller sides, respectively. And bars 1509A, 1509B, and 1509C illustrate the average roughness of the small-scale mixer impeller after smoothing measured at the impeller blade, impeller top, and impeller sides, respectively. In some implementations, the smoothing can comprise dipping the small-scale mixer impeller twice (2X) in a solvent bath or exposing it to solvent vapor, as described previously herein. For example, the smoothing can include dipping the small-scale in solvent twice, followed by exposing the small-scale mixer to evaporated solvent under a chemical fume hood for six or more hours. The roughness can be measured using a contact profilometer, a conformal microscope, or other suitable measuring device. As shown, the smoothing reduced the roughness of the small-scale mixer impeller to substantially the same roughness as that of the at-scale mixer impeller.

FIG. 16 shows a bar chart 1601 illustrating examples a comparison between average surface roughness of mixer tanks of an at-scale mixer (e.g., at-scale mixer 105), of a small-scale mixer before smoothing (e.g., rough small-scale mixer 103), and of the small-scale mixer after smoothing (e.g., smoothed small-scale mixer 103) in accordance with aspects of the present disclosure. More specifically, bar 1605 illustrates the average roughness of the small-scale mixer tank before smoothing, bar 1607 illustrates the average roughness of the at-scale mixer tank, and bar 1609 illustrates the average roughness of the small-scale mixer tank after smoothing. In some implementations, the smoothing can comprise dipping the small-scale mixer tank in a solvent bath or exposing the small-scale mixer tank to solvent vapor, as described previously herein.

FIG. 17 shows images 1703, 1705, 1707, and 1709 illustrating respective impeller surface roughness 1713, 1715, 1717, and 1719 of an example small-scale mixer impeller in accordance with aspects of the present disclosure. The image 1703 shows an at-scale impeller blade (e.g., of at-scale impeller 305). Images 1705, 1707 and 1709 show images of a small-scale impeller blade (e.g., of small-scale impeller 405) after dipping into dichloromethane 1×, 2× and 3×, respectively. As illustrated, the smoothing value in the 2× case shown in image 1707 substantially matches the smoothing value of the at-scale impeller blade in image 1703.

FIGS. 18-27 illustrate example processes for validating small-scale mixers generated in accordance with aspects of the present disclosure to model performance of a small-scale mixer in comparison to performance of a corresponding at-scale mixer. The small-scale mixer and the at-scale mixer can be the same or similar to those previously described herein (e.g., small-scale mixer 103 and at-scale mixer 105). In some implementations, the product used in the process is a biopharmaceutical product. For example, the biopharmaceutical product can comprise a shear sensitivity molecule, such as a formulated drug substance ("FDS"). In some implementations, the biopharmaceutical product can also include a surfactant. Additionally, in some implementations, the processes determine effects of shear stress from mixing products using the small-scale mixer versus the at-scale mixer. For example, the determination of effects is based on constant impeller tip speed and/or power-to-volume ratio (P/V). Impeller tip speed is the velocity of the outer edge of the impeller. As the highest mixing shear stress occurs at the impeller tip, maintaining a constant tip speed of the small-scale mixers with respect to the at-scale mixer avoids damage to products, such as, biopharmaceutical proteins. Power-to-volume ratio (P/V) is the effective energy input by unit volume of fluid. P/V (W/m3 (SI unit)) can be determined using the following equation, wherein Np is power number, p is density of the fluid (kg/m3), N is impeller speed (rpm or s-1), and D is Diameter of the impeller (m):

$$\frac{P}{V} = \frac{N_P \rho N^3 D^5}{V} \quad (1)$$

Further, in some implementations, the size of the small-scale mixer used in the process represents a worst-case scenario. For example, among a set of small-scale mixers having respective volumes scaled from an at-scale mixer, the worst-case scenario can be the small-scale mixer having the smallest size and the greatest scaling factor and, therefore, generating the greatest shear force.

FIGS. 18-20 illustrate an example validation process in accordance with aspects of the present disclosure. FIG. 18 shows a table 1801 illustrating example parameters of an at-scale mixer 1802 and a small-scale mixer 1803. In table 1801, column 1805 includes dimensions of an at-scale mixer 1802, including: a volume of about 2 L, an impeller diameter (D) of about 65.9 mm, and a tank diameter (T) of about 278 mm. Column 1807 includes dimensions of a corresponding small-scale mixer 1803, including: a volume of about 0.2 L, an impeller diameter (D) of about 31 mm, and a tank diameter (T) of about 129 mm. In some implementations, the dimensions of the small-scale mixer 1803 represent a worst-case scenario such that validation of the small-scale mixer 1803 also validates other small-scale mixers corresponding to the at-scale mixer 1802. For example, the small-scale mixer 1803 may have the greatest scaling factor (e.g., 7.9) among the example small-scale mixers described above regarding FIGS. 7, 8, and 9.

In accordance with the present example, the process illustrated in FIGS. 18-20 compares mechanical shear by mixing product with impellers of the at-scale mixer 1802 and the small-scale mixer 1803 (e.g., impeller 405 and impeller 305) operating at a constant tip speed of 0.626 m/s and 0.621 m/s, respectively. FIGS. 19 and 20 show tables 1901 and 2001 illustrating a comparison of the product mixed using at-scale mixer 1802 and the small-scale mixer 1803. More specifically, columns 1903 and 2003 indicate samples of the product taken at different times from the start of mixing, including at 0 minutes (T0), 30 minutes (T30), 60 minutes (T60), 90 minutes (T90), 150 minutes (T150), 240 minutes (T240), 300 minutes (T300), 480 minutes (T480), and 1,320 minutes (T1320). Corresponding to the sample times T0 to T1320 in columns 1903 and 2003, column 1905 compares pH of the product mixed using at-scale mixer 1802 and the small-scale mixer 1803. Column 1907 compares protein concentration of the product mixed using at-scale mixer 1802 and the small-scale mixer 1803. Column 1909 compares surfactant density (percent w/v) of the product mixed using at-scale mixer 1802 and the small-scale mixer 1803. Column 1911 compares turbidity of the product mixed using at-scale mixer 1802 and the small-scale mixer 1803. In table 2001 of FIG. 20, column 2005 compares purity of the product mixed using at-scale mixer 1802 and the small-scale mixer 1803. Column 2007 compares particle density (#/ml) of the product mixed using at-scale mixer 1802 and the small-scale mixer 1803. As indicated in tables 1901 and 2001, the modeling process validates that there no substantial difference in quality of the product mixed in the at-scale mixer 1802 and the corresponding small-scale mixer 1803 in terms of pH, protein concentration, surfactant density, turbidity, purity, and particle density.

FIGS. 21-24 illustrate another example validation process in accordance with aspects of the present disclosure. The present example validates quality of a product (e.g., a fully human monoclonal antibody) mixed without any surfactant (e.g., PS 20) using the small-scale mixer 1803 versus the at-scale mixer 1802. The validation process evaluates two approaches of scaling the at-scale based on different parameters: at-scale mixer 1802A is scaled for constant power-per-volume (P/V) and at-scale mixer 1802B is scaled for mixing at constant impeller tip speed. As shown in column 2105, 2107, and 2109, the dimensions of the at-scale mixer 1802A, 1802B and small-scale mixer 1803 can be the same or similar to those described above regarding FIGS. 18-20. Further, in accordance with the present example, the 0.483 m/s tip speed of the at-scale mixer 1802B indicated in column 2105 can be substantially equal to the 0.481 m/s tip speed of the small-scale mixer indicated in column 2109. Additionally, in accordance with the present example, the 43.0 W/m³ power-per-volume of the at-scale mixer 1802B indicated in column 2107 (e.g.,) can be substantially equal to the 43.3 W/m³ power-per-volume of the small-scale mixer 1803 indicated in column 2109.

FIGS. 22, 23, and 24 show tables 2201, 2301 and 2401 illustrating results of the comparison of the at-scale mixer 1802A, 1802B and the small-scale mixer 1803 described above regarding FIG. 21. More specifically, columns 2205, 2305, and 2405 indicate samples of the product taken at different times from the start of mixing of a product, including at 0 hours (T0), one hour (T1 h), two hours (T2 h), five hours (T5 h), eight hours (T8 h), 24 hours (T24 h), and 30 hours (T30 h). Corresponding to the individual sample times T0 h to T30 h, columns 2207 compares pH of the product mixed using at-scale mixer 1802A, 1802B and the small-scale mixer 1803. Column 2209 compares protein concentration of the product mixed using at-scale mixer 1802 and the small-scale mixer 1803, illustrating no change in total protein concentration from the control (or T0) to T30 h. Column 2211 compares turbidity of the product mixed using at-scale mixer 1802 and the small-scale mixer 1803. In FIG. 23, column 2307 of table 2301 compares purity of the product mixed using at-scale mixer 1802A, 1802B and the small-scale mixer 1803. In FIG. 24, column 2407 of table 2410 compares particle quantity-per-volume (#/ml) of the product mixed using at-scale mixer 1802A, 1802B and the small-scale mixer 1803. In accordance with some implementations, the example illustrated in FIGS. 21-24 represent a worst-case tip shear value for the small-scale mixer (e.g., 9.791 s$^{-1}$ in column 2109), which can represent very high with regard to tip shear value for the at-scale mixer (e.g., 4.555 s$^{-1}$ in column 2105 and 5.857 s$^{-1}$ in column 2107), as evident by increased turbidity 2211. By evaluating the small-scale mixer 1803 in the worst-case, the evaluation determines whether products mixed using the small-scale mixer 1803 would be affected when mixed using the at-scale mixer 1802A and 1802B.

FIGS. 25-27 illustrate another example validation process in accordance with aspects of the present disclosure. The example process of FIGS. 25-27 involves mixing a product (e.g., a fully human monoclonal antibody) without surfactant (e.g., PS 20). The validation process evaluates an example mixing of product using a substantially constant tip speed during two-phases of the process. The present example assesses stresses in the small-scale mixer 180 due to shear stress, cavitation (foaming, bubbles) and air/water interface stress. In accordance with the present example, the first phase (T0 h-T4 h) shown in FIG. 25 operates for four hours and the second phase (T4 h-T24 h) shown in FIG. 26 operates for 20 additional hours. As shown in column 2105, 2107, and 2109, the dimensions of the at-scale mixer 1802A and small-scale mixer 1803 can be the same or similar to those described regarding FIGS. 18-20. In a first phase of the present example shown in table 2501 of FIG. 25, the at-scale mixer 1802A can mix the product at a tip speed of 1.242 m/s and a 360 RPM maximum, and the small-scale mixer 1802A can mix the product at a tip speed of 1.252 m/s and a 780 RPM maximum. In a second phase of the present example shown in table 2601 of FIG. 26, tip speed is reduced due to foaming. In the present example of FIG. 26, the at-scale mixer 1802A can mix the product at a tip speed of 0.863 m/s and a 250 RPM maximum, and the small-scale mixer 1802A can mix the product at a tip speed of 0.867 m/s and a 540 RPM maximum. In the above example, the product can be a fully human monoclonal antibody drug substance (DS), which may be highly sensitive to shear (in general). Prior to each mixing study, the bulk drug substance may be diluted to the final formulated drug substance (FDS), using, for example, 10 mM sodium phosphate, 5% (w/v) sucrose, 40 mM sodium chloride, and with or without PS20, at pH 6.2. The physical properties of the formulated drug substance can be density: 1.02536 g/cm3, viscosity: 1.504 cP (at 20° C.), 1.293 cP (at 25° C.).

FIG. 27 shows a table 2701 illustrating results of the process comparing the at-scale mixer 1802B and the small-scale mixer 1803 described above regarding FIGS. 25 and 26. More specifically, column 2705 indicate samples taken at different times from the start of mixing of a product, including at 0 minutes (T0), 30 minutes (T30), 60 minutes (T60), 90 minutes (T90), 150 minutes (T150), 240 minutes (T240), 300 minutes (T300), 420 minutes (T420), 480 minutes (T480), and 1,440 minutes (T1440). Column 2707 compares pH of the product mixed using at-scale mixer 1802B and the small-scale mixer 1803. Column 2709 compares protein concentration of the product mixed using at-scale mixer 1802B and the small-scale mixer 1803. Column 2711 compares turbidity of the product mixed using at-scale mixer 1802B and the small-scale mixer 1803. Column 2713 compares purity of the product mixed using at-scale mixer 1802B and the small-scale mixer 1803. Column 2715 compares particle quantity per volume (#/ml) of the product mixed using at-scale mixer 1802B and the small-scale mixer 1803. Table 2701 indicates that the samples experienced higher shear stress, hence higher increase in turbidity, purity, and particulate matter. Therefore, the small-scale mixer could be used to evaluate shear stress mixing.

The present disclosure is not to be limited in terms of the particular implementation described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

The invention claimed is:

1. A system for producing a first mixer for mixing biopharmaceutical proteins into an aqueous formulation, the system comprising:
   a first plurality of dimensions based on a respective plurality of dimensions of a second mixer;
   a second plurality of dimensions independent of the respective plurality of dimensions of the second mixer, wherein the second plurality of dimensions is generated by a computational fluid dynamic technique simulating physical forces on an impeller and shear forces on the biopharmaceutical proteins in the aqueous formulation by the impeller over various rotational velocities, fluid densities, and temperatures, and wherein the second plurality of dimensions are calculated to prevent degradation of the biopharmaceutical proteins in the aqueous formulation;
   a three-dimensional printer configured to receive the first plurality of dimensions and the second plurality of dimensions and produce the first mixer, wherein the first mixer has a plurality of dimensions based on a combination of the first plurality of dimensions and the second plurality of dimensions; and
   a smoothing apparatus configured to smooth a surface of the first mixer, wherein smoothing the surface of the first mixer prevents degradation of the biopharmaceutical proteins in the aqueous formulation.

2. The system of claim 1, wherein a scaling factor relates the first plurality of dimensions of the first mixer to the respective plurality of dimensions of the second mixer.

3. The system of claim 1, wherein the first plurality of dimensions of the first mixer and the respective plurality of dimensions of the second mixer comprise impeller clearance off bottom of mixer (C), impeller diameter (D), liquid level (H), rotational speed (N), tank diameter (T), blade width (W), blade height (BH), and baffle width (WB).

4. The system of claim 1, wherein the second plurality of dimensions correspond to dimensions of an impeller of the first mixer.

5. The system of claim 1, wherein the three-dimensional printer is configured to produce the first mixer using one of the following: PC (polycarbonate), ABS (acrylonitrile butadiene styrene), PLA (polylactic acid), PET (polyethylene terephthalate), nylon, metal, and glass/PET.

6. The system of claim 1, wherein the smoothing apparatus is configured to mechanically smooth the surface of the first mixer.

7. The system of claim 1, wherein the smoothing apparatus is configured to chemically smooth the surface of the first mixer using a volatile solvent bath.

8. The system of claim 7, wherein the volatile solvent bath includes acetone or dichloromethane.

9. A method for producing a first mixer for mixing biopharmaceutical proteins into an aqueous formulation, the method comprising:
   obtaining a respective plurality of dimensions of a second mixer;
   determining a first plurality of dimensions of the first mixer based on the respective plurality of dimensions of the second mixer;
   determining, by simulating physical forces on an impeller and shear forces on the biopharmaceutical proteins in the aqueous formulation by the impeller over various rotational velocities, fluid densities, and temperatures generated by the first mixer using a computational fluid dynamics technique, a second plurality of dimensions independent of the plurality of dimensions of the second mixer, wherein the second plurality of dimensions are calculated to prevent degradation of the biopharmaceutical proteins in the aqueous formulation; and
   generating, using a three-dimensional printer, the first mixer having a plurality of dimensions based on a combination of the first plurality of dimensions and the second plurality of dimensions.

10. The method of claim 9, further comprising: smoothing a surface of the first mixer, wherein smoothing the surface of the first mixer prevents degradation of the biopharmaceutical proteins in the aqueous formulation.

11. The method of claim 10, wherein smoothing comprises mechanically abrading the surface of the first mixer.

12. The method of claim 10, wherein smoothing comprises chemically polishing the surface of the first mixer using a volatile solvent.

13. The method of claim 9, wherein the first plurality of dimensions of the first mixer and the dimensions of the second mixer comprise impeller clearance off bottom of mixer (C), impeller diameter (D), liquid level (H), rotational speed (N), tank diameter (T), blade width (W), blade height (BH), and baffle width (WB).

14. The method of claim 9, wherein determining the second plurality of dimensions of the first mixer comprises determining physical forces on an impeller of the first mixer during mixing of the biopharmaceutical proteins in the aqueous formulation.

15. The method of claim 9, wherein generating the first mixer comprises fused filament fabrication of the first mixer.

16. The method of claim 9, wherein generating the first mixer comprises producing the first mixer using one of the following: PC (polycarbonate), ABS (acrylonitrile butadiene styrene), PLA (polylactic acid), PET (polyethylene terephthalate), nylon, metal, and glass/PET.

17. The method of claim 9, further comprising generating a first volume of a first product using the second mixer; generating a second volume of the first product using the first mixer; and comparing one or more physical parameters of the first volume and the second volume.

18. The method of claim 17, further comprising: comparing shear stress of generating the first volume with shear stress of generating the second volume.

19. The method of claim 18, wherein the shear stress comprises shear stress imparted on an impeller of the first mixer.

20. The method of claim 17, wherein the physical parameters include one or more of visual inspection, pH, protein concentration, turbidity, purity, and particulate density.

\* \* \* \* \*